United States Patent
Reniau

(10) Patent No.: US 6,811,117 B2
(45) Date of Patent: Nov. 2, 2004

(54) PROCESS FOR ASSEMBLY OF LANDING GEAR ON AN AIRCRAFT STRUCTURE AND AIRCRAFT COMPRISING SUCH LANDING GEAR

(75) Inventor: Grégory Reniau, Tournefeville (FR)

(73) Assignee: Airbus France (FR)

( * ) Notice: Subject to any disclaimer, the term of this patent is extended or adjusted under 35 U.S.C. 154(b) by 0 days.

(21) Appl. No.: 10/318,858

(22) Filed: Dec. 12, 2002

(65) Prior Publication Data

US 2003/0111576 A1 Jun. 19, 2003

(30) Foreign Application Priority Data

Dec. 18, 2001 (FR) .............................. 01 16365

(51) Int. Cl.⁷ .............................................. B64C 25/10
(52) U.S. Cl. ................................. 244/102 R; 384/206
(58) Field of Search ......................... 244/17.17, 100 R, 244/102 R, 102 A; 384/206

(56) References Cited

U.S. PATENT DOCUMENTS

| | | | | |
|---|---|---|---|---|
| 2,960,287 A | * | 11/1960 | Barlow ................... | 244/102 R |
| 4,095,856 A | * | 6/1978 | Markovitz ................ | 384/206 |
| 4,412,665 A | * | 11/1983 | Kramer et al. .......... | 244/102 R |
| 6,004,037 A | * | 12/1999 | Harris et al. ............ | 384/206 |
| 6,042,270 A | | 3/2000 | Meyer ..................... | 384/206 |
| 6,129,310 A | | 10/2000 | Squires et al. .......... | 244/102 R |

FOREIGN PATENT DOCUMENTS

| | | |
|---|---|---|
| DE | 15 25 178 | 11/1969 |
| DE | 37 29 102 | 4/1988 |
| JP | 56 101418 | 8/1981 |
| JP | 56 052622 | 11/1981 |

OTHER PUBLICATIONS

Preliminary Search Report issued by French Patent Office.

* cited by examiner

Primary Examiner—Robert P. Swiatek
(74) Attorney, Agent, or Firm—Thelen Reid & Priest LLP

(57) ABSTRACT

A landing gear hinge shaft is installed on an aircraft structure using at least two ball joints (22), at least one of which is adjustable. The differences between the theoretical and real positions of the centers of the balls are measured, and the adjustments that have to be made to bring the centers of the balls back to their theoretical positions is deduced. This is done by making a first adjustment in the axial direction using a shim (30) and a second adjustment in the radial direction by adjusting the rotation of an inner cage (34) and an outer cage (36) of the ball joint. The inner and outer cages have eccentric axes that facilitate the adjustment.

8 Claims, 3 Drawing Sheets

PROCESS FOR ASSEMBLY OF LANDING GEAR ON AN AIRCRAFT STRUCTURE AND AIRCRAFT COMPRISING SUCH LANDING GEAR

This application is claims priority of French application no. 0116365 which was filed on Dec. 18, 2001, and was not published in English.

TECHNICAL FIELD

The invention relates to a process for installation of a landing gear on an aircraft structure. More precisely, the invention relates to an installation process for positioning the landing gear with the required precision, regardless of the manufacturing tolerances of the said structure, and particularly when the tolerances are greater than this precision.

The invention also relates to an installation device with an adjustable ball joint designed to implement this process.

The invention also relates to an aircraft fitted with landing gear which is installed according to this process.

The process and device according to the invention may be used on all aircraft. However, they are particularly suitable for large and very large carrier aircraft in which the landing gear and the structure in which it fits are large.

STATE OF PRIOR ART

Landing gear is usually installed on an aircraft structure through several hinge shafts parallel to each other and the ends of which are supported by ball joints inserted in reamings formed in the said structure.

Manufacturing tolerances for the aircraft structure are particularly related to part machining and positioning tolerances, and to temperature variations and deformations of the structure when it is assembled.

In general, these manufacturing tolerances are compatible with the required positioning precision of the landing gear with respect to the said structure.

However, it is possible that manufacturing tolerances are greater than the required precision for positioning the landing gear with respect to the structure. This situation arises particularly when the dimensions of the landing gear and the structure into which it fits are large. For example, this is the case for large and very large carrier aircraft.

This problem can be solved by machining reamings in the structure with a diameter less than the required diameter for the placement of the ball joints, leaving a collar with a thickness greater than manufacturing tolerances around the periphery of each of the reamings. The reamings corresponding to the ends of the different hinge shafts used to assemble the landing gear are then machined subsequently on the assembly line using an appropriate machine.

The machine used for this purpose then comprises a basic element with an appropriate stiffness and machining means fixed on this element. The positions of the machining means are defined so that the different reamings can be machined at their theoretical positions, with tolerances less than the required precision. The machining thus achieved concerns firstly the position of the reamings in the X, Z plane of the structure, and secondly surfacing of the collars in order to obtain the required position of the ball joints along a Y axis perpendicular to the said plane and coincident with the axis of the corresponding hinge shaft.

However, there are several disadvantages with this solution.

Some of these disadvantages are related to the machine. Thus, its cost is high and it is large. Therefore, it requires a large storage area outside production periods during which it is used. It is also a complex machine, which can be expensive and difficult to maintain. Furthermore, the use of such a machine requires additional time during assembly of the landing gear. This time may be about 10 days in the case of a landing gear for a large carrier aircraft, which is very undesirable.

Other disadvantages concern for example the difficulty of making a surface treatment of machined parts on the assembly line, the risk of deformation of the structure after the machine is removed, particularly due to stresses induced in the material during machining, etc.

Furthermore, document JP-B-56052622 describes a device to adjust the position of the intersection point of the Y axis of a hinge shaft in the X, Z plane of the support structure. However, this device does not enable the hinge shaft to be supported by a ball joint. Therefore, it is not suitable for the attachment of a landing gear, particularly in the case in which the two parts of the structure in which the opposite ends of the landing gear hinge shafts fit are not parallel due to manufacturing tolerances of the said structure. Furthermore, an aircraft landing gear is usually installed using ball joints, due to possible deformations of the structure particularly during aircraft taxiing periods.

PRESENTATION OF THE INVENTION

The purpose of the invention is precisely to eliminate at least some of the disadvantages according to prior art.

More precisely, the invention relates to a process and a device for installation of an aircraft landing gear, in which the innovative design positions the said landing gear with the required precision even when the manufacturing tolerances of the structure on which it is installed are greater than this precision.

According to the invention, this objective is achieved by means of a process for assembly of at least one hinge shaft of the landing gear on an aircraft structure, through two ball joints connected to the said structure, characterized in that it comprises the following steps:

measurement of the differences between the theoretical and the real positions of the centers of the ball joints;

actuation of adjustment means associated with at least one of the said ball joints, to bring the centers of the ball joints into their theoretical position;

blockage of the said adjustment means; and installation of the hinge shaft in the ball joints.

Use of this process makes it possible to adjust the position of the pivot point of the ball joints along three orthogonal directions. The landing gear can thus be positioned precisely, regardless of the manufacturing tolerances of the structure that supports it.

Preferably, actuation of the adjustment means comprises actuation of axial adjustment means capable of displacing the centers of the ball joints parallel to the axis of the hinge shaft and actuation of radial adjustment means capable of displacing the centers of the ball joints in a plane perpendicular to the axis of the hinge shaft.

Advantageously, actuation of the axial adjustment means then consists of placement of at least one thickness shim between the collars formed on a ring connected to the structure and to a cage of the ball joint.

Also advantageously, actuation of the radial adjustment means comprises a first rotation of an outer cage of the ball joint in a first reaming formed in a ring fixed to the structure, and a second rotation of an inner cage of the ball joint in a second reaming formed in the said outer cage of the ball joint, in an eccentric position offset from the axis of the first reaming, the said inner cage comprising a spherical inner surface offset from the axis of the second reaming and in which the ball of the ball joint fits. The first rotation causes displacement of the second reaming formed in the outer cage of the ball joint around the axis of the first reaming, formed in the ring. The second rotation causes displacement of the spherical inner surface formed in the inner cage of the ball joint around the axis of the second reaming formed in the outer cage of the ball joint.

In this case, a ball joint is preferably used in which the second reaming and the spherical inner surface are eccentric by the same distance e, offset from the axis of the first reaming and from the axis of the second reaming.

According to an advantageous improvement to the invention, the radial adjustment means are actuated without disassembly of the ball joint.

Also advantageously, the step to actuate the adjustment means is preceded by a step to place marking means on the structure or on a ring fixed to the structure and in which the ball joint is installed.

The invention also relates to an aircraft in which the landing gear is installed using such a process.

The invention also relates to a device for installation of a landing gear hinge shaft on an aircraft structure, the said device comprising at least one ball joint comprising a cage that can be fixed on the structure and a ball that can support the said hinge shaft, and being characterized in that the cage comprises an outer cage that can be fixed on the structure, the said outer cage being centered on a first axis and with a reaming with an axis offset from the first axis, an inner cage installed free to rotate in the reaming and with a spherical inner surface with its axis offset from the reaming axis, and means of blocking the inner cage and the outer cage in determined angular positions in which the outer cage is installed in a ring provided with marking means and that can be fixed on the structure.

BRIEF DESCRIPTION OF THE FIGURES

We will now describe an illustrative example of a preferred embodiment of the invention with reference to the attached drawings, that is in no way limitative, and in which.

DETAILED DESCRIPTION OF A PREFERRED EMBODIMENT OF THE INVENTION

Figure 1:
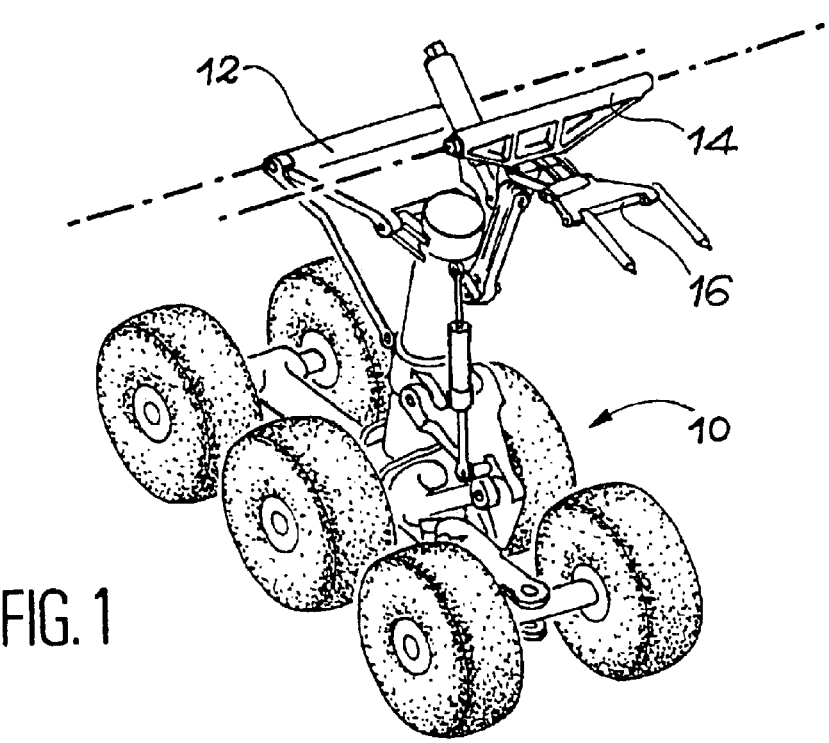
FIG. 1 is a perspective view that diagrammatically shows an aircraft landing gear which may be installed using the process according to the invention.

As illustrated diagrammatically in FIG. 1, an aircraft landing gear 10 is usually installed on the aircraft structure through parallel hinge shafts, using ball joints inserted between the ends of the hinge shafts and the adjacent parts of the structure.

In the embodiment shown as an example in FIG. 1, the landing gear 10 comprises a main articulation hinge shaft 12, a primary strut hinge shaft 14 and a secondary strut hinge shaft 16. In general, the landing gear is installed on the structure using at least two hinge shafts.

Figure 2:
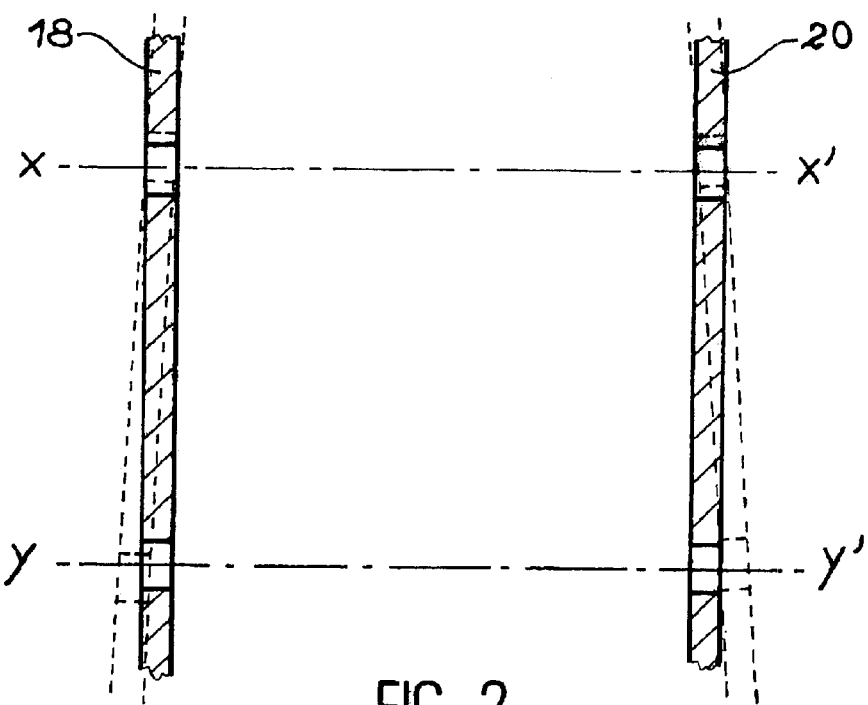
FIG. 2 diagrammatically illustrates the offset that can exist between the theoretical position (shown in solid lines) of the ball joints used for installation of an aircraft landing gear, and the real location (shown in dashed lines), in a deliberately emphasized manner, allowing for manufacturing tolerances of the aircraft structure.

FIG. 2 very diagrammatically illustrates the simplest case in which the landing gear is installed between two walls 18 and 20 of the structure using two hinge shafts, in which only the XX' and YY' axes are shown, in a deliberately exaggerated manner. More precisely, the solid lines represent the theoretical locations of the walls 18 and 20, and the dashed line represent the possible real locations of these walls, taking account of manufacturing tolerances of the aircraft structure.

According to the invention, the first step is to measure the differences between the theoretical position and the real position of the center of each of the ball joints, on the walls 18 and 20 of the structure. More precisely, due to the fact that the ball joints are not yet installed at this stage of the process, the center of each of the ball joints is represented by the intersection point between the geometric axis of the hinge shaft and the median plane of the wall. This intersection point is called the "interface point".

In practice, differences between the theoretical interface points and real interface points are measured by any appropriate known means, particularly by laser sighting.

When these differences have been measured, the adjustments that have to be made on the adjustable ball joints used are deduced, according to the invention, to install each of the hinge shafts such as 12, 14 and 16 on the walls 18 and 20 of the aircraft structure.

More precisely, depending on tolerances related to machining of the structure and depending on the required positioning precision, each hinge shaft may be supported by two adjustable ball joints, or by a single conventional ball joint at one end and an adjustable ball joint at the other end.

Figure 3:
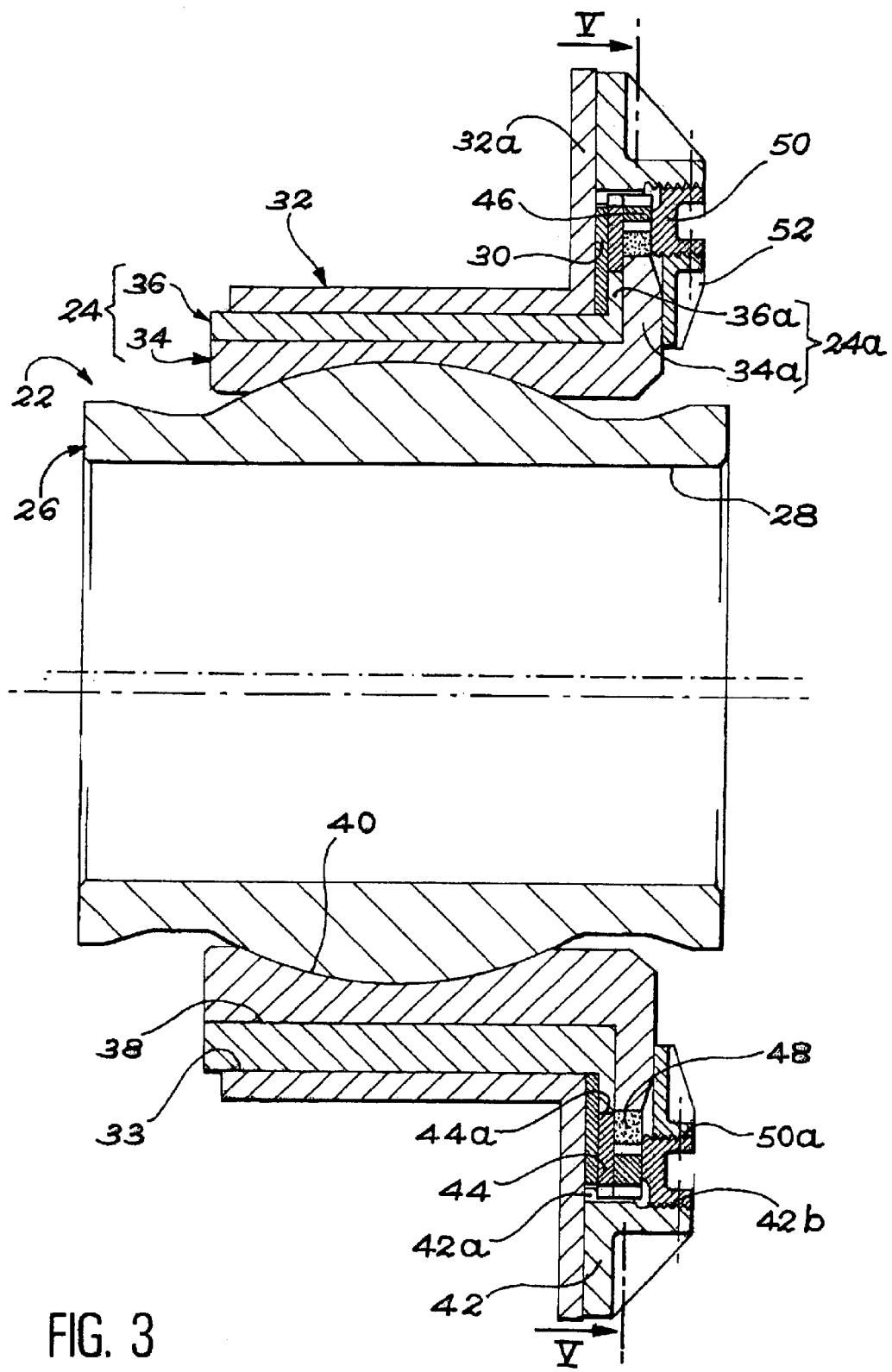
FIG. 3 is a sectional side view along a plane passing through the axis of an adjustable ball joint according to the invention.
Figure 4:
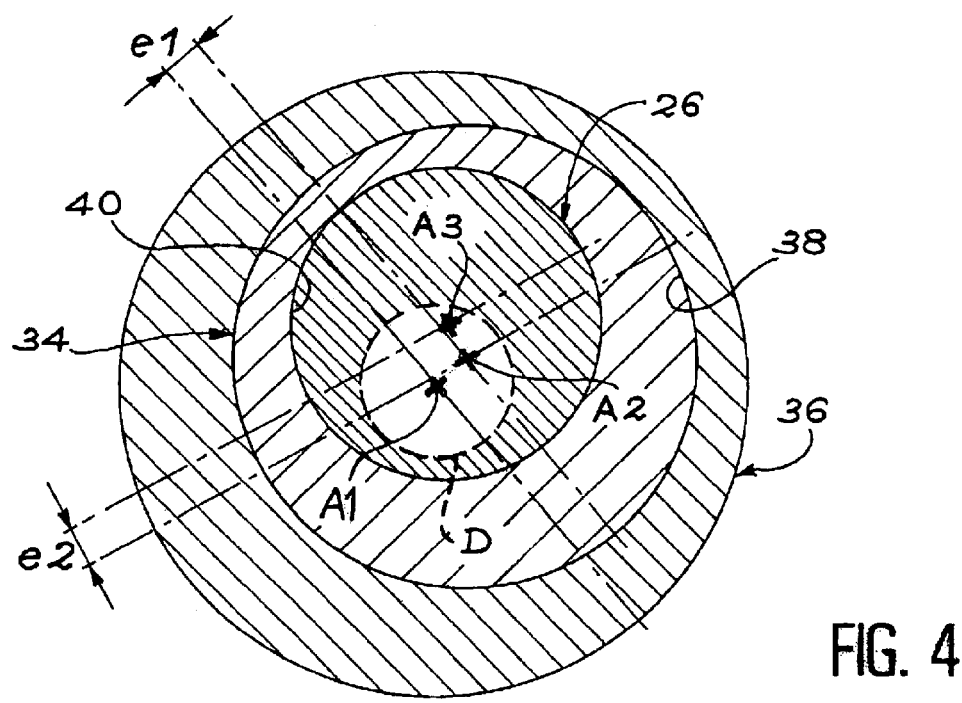
FIG. 4 is an end view that diagrammatically illustrates the radial adjustment of the bearing shown in FIG. 3, in a plane perpendicular to the axis of the ball joint.
Figure 5:
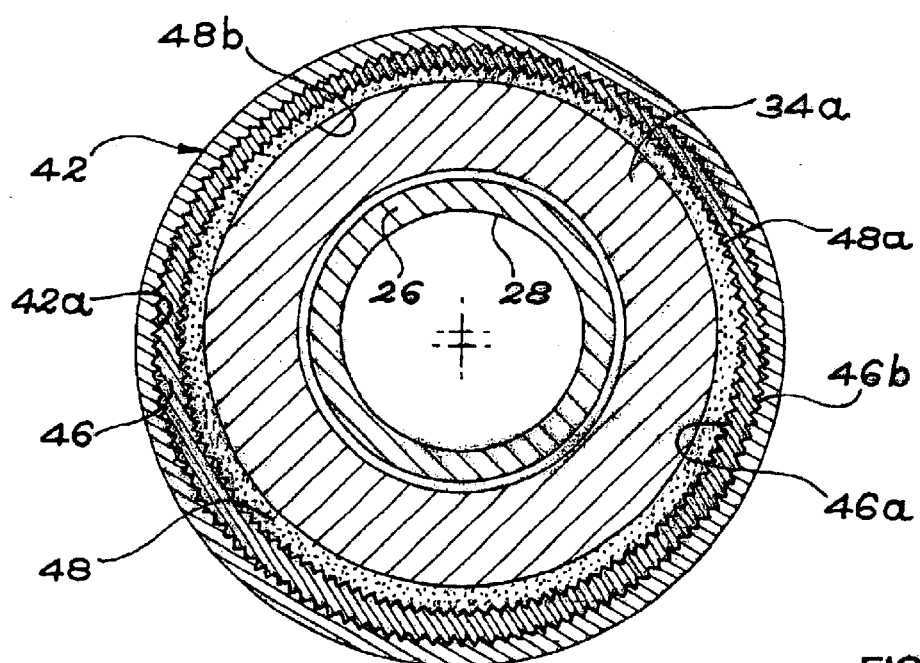
FIG. 5 is a sectional view along line V–V in FIG. 3.

We will now describe an adjustable ball joint as an example with reference to FIGS. 3 to 5, to make it possible to understand the nature of the adjustments that can be made on this type of ball joints, when they are used.

Conventionally, the adjustable ball joint 22 used in accordance with the invention comprises a ball cage 24 and a ball 26, installed in the cage 24 such that a ball movement can be made around the center of the ball joint. The cage 24 is designed to be fixed in one of the walls 18 and 20, whereas the ball 26 is penetrated by a reaming 28 into which the corresponding hinge shaft fits.

The adjustable ball joint 22 includes axial adjustment means and radial adjustment means.

The axial adjustment means are designed to move the center of the swivel along the direction parallel to the axis of the hinge shaft that it supports.

In practice, these axial adjustment means may particularly include one or several thickness shims 30 inserted between two collars 24a and 32a formed respectively on the ball cage 24 and on a ring 32 that will be fixed in the corresponding wall of the structure. As a variant, the thickness shim(s) 30 may also be inserted directly between the collar 24a and the corresponding wall of the aircraft structure.

Radial adjustment means are designed to move the center of the ball in a plane perpendicular to the axis of the hinge shaft that it supports.

In the embodiment illustrated in FIGS. 3 to 5, the radial adjustment means comprise a ball cage 24 made in two parts 34 and 36. The parts 34 and 36 form an inner cage and an outer cage respectively of the ball cage 24.

The outer cage 36 is installed in a first cylindrical reaming 33 formed on the inside of the ring 32 or directly on the inside of the wall of the structure. Consequently, the outer cage 36 has a cylindrical outer surface. The outer cage 36 is passed through by a second cylindrical reaming 38, in which the axis A2 is parallel to the axis A1 of the cylindrical reaming 33 and the outer cylindrical surface of the outer cage. Furthermore, the axis A2 is offset by a distance e1 given from the A1 axis.

The inner cage 34 is installed on the inside of the outer cage 36. Consequently, it comprises an outer cylindrical surface, with axis A2 and a uniform diameter approximately equal to the diameter of the cylindrical reaming 38, respecting clearances and tolerances known to an expert in the subject. The inner cage 34 also comprises a spherical inner surface 40 in which the ball 26 of the ball joint fits, respecting the clearances and tolerances known to an expert in the subject. The spherical inner surface 40 of the inner cage 34 is offset such that an axis A3 parallel to the axis A2 and passing through the center of the said spherical surface 40 is offset by a distance e2 from this axis A2.

In practice, particularly for large ball joints, the inner cage 34 is frequently composed of two half cages that are connected to each other through their joint plane after the ball has been inserted. This joint plane may indifferently be a plane passing through the A2 axis or a plane orthogonal to this A2 axis.

As shown diagrammatically in FIG. 4, this layout makes it possible to move the A3 axis of the ball 26 of the ball joint in a plane perpendicular to this axis, by combined rotations of the inner cage 32 about its axis A1 and of the inner cage 34 about its axis A2.

According to one preferred embodiment of the invention shown in FIG. 4, the distances e1 and e2 are equal to the same value e. In this case, the combined rotations of the outer cage 36 and the inner cage 34 make it possible to position the A3 axis and consequently the interface point of the hinge shaft considered, at any point on a disk D with diameter 4e centered on the A1 axis of the outer cage 36.

For each ball joint 22, the thickness of the shim 30 and the angular positions of the outer cage 36 and the inner cage 34 are determined as a function of the differences measured between the real and theoretical positions of the interface points. The values of this thickness and these angular positions may be either calculated or extrapolated from a correspondence table provided with the ball joints.

For each ball joint 22, the next step is to place marking or fool proofing means on the wall 18 or 20 of the structure or on the ring 32, when there is a ring.

In the embodiment illustrated as an example in FIGS. 3 and 5, the marking means comprise an outer toothed ring 42, designed to be fixed on the wall 18 or 20 of the aircraft structure in the production line. The outer ring 42 is provided with an inner toothing 42a.

The marking means also comprise a first intermediate toothed ring 44 with an outer toothing that comes into contact with the inner toothing 42a of the outer ring 42. The first intermediate toothed ring 44 has an eccentric reaming 44a into which the collar 36a of the outer cage 36 fits, when the said cage occupies the angular position imposed by the radial adjustment.

The marking means also comprise a second intermediate toothed ring 46 fitted with an inner toothing 46a and an outer toothing 46b also capable of coming into contact with the inner toothing 42a of the outer ring 42.

An inner toothed ring 48 is also provided with outer toothing 48a that can come into contact with the inner toothing 46a of the second intermediate ring 46. The inner toothed ring 48 has an eccentric reaming 48b in which the collar 34a of the inner cage 34 fits, when the said cage occupies the angular position imposed by the radial adjustment.

Finally, the adjustment means also comprise an outer annular nut 50 designed to be screwed into a threaded terminal part 42b of the outer ring 42, and an inner annular nut 52, designed to be screwed in to a threaded hole 50a of the outer annular nut 50.

The outer nut 50 tightens the stack consisting of the shim 30, the first intermediate ring 44 and the assembly formed by the second intermediate ring 46 and the inner ring 48, into contact with the collar 32a of the ring 32.

The inner nut 52 tightens the stack consisting of the shim 30, the collar 36a of the outer cage 36 and the collar 34a of the inner cage 34, into contact with the collar 32a of the ring 32.

In practice, the toothed rings 44, 46 and 48 act as foolproofing devices and as rotation stops for the outer cage 36 and the inner cage 34. When these elements are properly installed, they are fixed on the outer ring 42 using the outer nut 50. These elements will not be disassembled later, even when the ball joint 22 needs to be replaced for maintenance operations.

When replacing the ball joint 22, the operator puts the new ball joint into position by turning each of the cages 34 and 36 in sequence as a function of the position of the toothed rings 44, 46 and 48 that had already been fixed during their installation in the production line. When the right positions have been found, the ball joint enters into its housing. It is blocked in this position by placement of the inner nut 52.

Note that the marking means that have just been described may be replaced by simple marking. The operator then positions the cages 34 and 36 by rotating them until the markings provided on them correspond to the markings made in the production line on the aircraft structure.

The operation that has just been described in detail for one of the ball joints is repeated for all adjustable ball joints associated with the different hinge shafts supporting the landing gear.

The assembly process terminates with the installation of the hinge shaft(s) 12, 14 and 16 in the ball joints installed as described above.

The process according to the invention can thus achieve the required positioning precision of the landing gear even when the manufacturing tolerances of the structure that supports the landing gear are such that the differences between the theoretical and real positions of the reamings of the fitting into which the ball joints fit are greater than the required precision.

What is claimed is:

1. Process for assembly of at least one hinge shaft of a landing gear on an aircraft structure, through two ball joints connected to the said structure, characterized in that it comprises the following steps: measurement of the differences between the theoretical positions and the real positions of the centers of the ball joints; actuation of adjustment means associated with at least one of the said ball joints, to bring the centers of the ball joints into their theoretical positions; blockage of the said adjustment means; and installation of the at least one hinge shaft in the ball joints.

2. Assembly process according to claim 1, in which the actuation of the adjustment means includes actuation of axial adjustment means capable of displacing the centers of the ball joints parallel to the axis of the hinge shaft and actuation of radial adjustment means capable of displacing the centers of the ball joints in a plane perpendicular to the axis of the hinge shaft.

3. Assembly process according to claim 2, in which the actuation of the axial adjustment means consists of placing at least one thickness shim between the collars formed on a ring connected to the structure and to a cage of the ball joint.

4. Assembly process according to claim 2, in which the radial adjustment means are actuated by making a first rotation of an outer cage of the ball joint in a first reaming formed in a ring fixed to the structure, and a second rotation of an inner cage of the ball joint in a second reaming formed in the said outer cage of the ball joint, at a location offset from an axis of the first reaming, the said inner cage comprising a spherical inner surface that is offset from the axis of the second reaming and in which the ball of the ball joint fits.

5. Assembly process according to claim 4, in which a ball joint is used in which the second reaming and the spherical inner surface are offset by the same distance e from the axis of the first reaming and the axis of the second reaming, respectively.

6. Assembly process according to claim 2, in which the radial adjustment means are actuated without disassembling the said ball joint.

7. Assembly process according to claim 1, in which the actuation step of the adjustment means is preceded by a step in which marking means are placed on the structure or on a ring attached to the structure and in which the ball joint is installed.

8. Assembly process for an aircraft comprising a landing gear installed on an aircraft structure, through two ball joints connected to the said structure, characterized in that the process comprises the following steps:

measurement of the differences between the theoretical positions and the real positions of the centers of the ball joints;

actuation of adjustment means associated with at least one of the said ball joints, to bring the centers of the ball joints into their theoretical positions;

blockage of the said adjustment means; and installation of the hinge shaft in the ball joints.

* * * * *